United States Patent Office 3,560,462
Patented Feb. 2, 1971

3,560,462
VINYL CHLORIDE COPOLYMERS AND PROCESS FOR PREPARING SAME
Elliott Farber, Trenton, and Marvin Koral, Warren, N.J., assignors to Tenneco Chemicals, Inc., a corporation of Delaware
No Drawing. Filed Sept. 15, 1967, Ser. No. 668,218
Int. Cl. C08f 15/00
U.S. Cl. 260—87.5   8 Claims

ABSTRACT OF THE DISCLOSURE

The rate of polymerization of vinyl chloride can be controlled by incorporating in it a small amount of a long chain $\alpha$-olefin. The resulting copolymers, which are characterized by excellent processability and other valuable properties, are of particular value in the production of compositions that are to be used as floor coverings, wall coverings, shoe soles and heels, and the like.

---

This invention relates to vinyl chloride polymers and to a method for thier production. More particularly, it relates to the use of a long chain $\alpha$-olefin to control the rate of polymerization of vinyl chloride and to the production of vinyl chloride-$\alpha$-olefin copolymers that have excellent processing characteristics and other valuable properties.

When vinyl chloride is polymerized, the rate at which polymerization takes place generally increases with time. This autoacceleration of the polymerization rate, which has been attributed to polymerization of monomer within the precipitated polymer particles where the usual free radical termination reactions are inhibited, poses a serious problem in the commercial production of poly(vinyl chloride). As the degree of autoacceleration increases, the polymerization rate and the evolution of heat by the exothermic polymerization reaction are rapidly increased. Because of the increased rate of evolution of heat and because the ability of the system to dissipate heat rapidly is considerably decreased by the presence of sizeable amounts of precipitated polymer in the reactor, the cooling capacity of the system must be greatly expanded when there is the likelihood that autoacceleration of the polymerization rate will occur in order to maintain the reaction mixture at the constant reaction temperature that is necessary if a uniform product is to be obtained.

In accordance with the present invention, it has been found that the tendency of vinyl chloride to undergo autoaccelerated polymerization reactions can be substantially reduced by incorporating in the reaction mixture a small amount of a long chain $\alpha$-olefin. While many of the properties of the resulting copolymers are equivalent to those of the corresponding poly(vinyl chloride), their processing characteristics and certain other properties have been found to be superior to those of the unmodified polymers.

To obtain the desired control of the polymerization reaction and to produce the improved polymers, at least 0.1 percent by weight of a long chain $\alpha$-olefin must be added to the vinyl chloride prior to its polymerization. Five percent or more of the $\alpha$-olefin may be used if desired, but the use of these larger amounts does not result in corresponding improvements in the control of the polymerization reaction or the properties of the resulting interpolymer. Optimum results are ordinarily obtained when the monomer mixture contains 97 percent to 99.5 percent by weight of vinyl chloride and 0.5 percent to 3 percent by weight of a long chain $\alpha$-olefiin.

The $\alpha$-olefins that may be used in the practice of this invention are those that contain from 10 to 22 carbon atoms, for example, decene-1, dodecene-1, tetradecene-1, hexadecene-1, octadecene-1, eiocosene-1, docosene-1, and mixture thereof. Particularly good results have been mixtures thereof. Particularly good results have been in the reaction mixture.

The copolymers of this invention may be prepared by any of the well-known emulsion or suspension polymerization procedures. For example, they may be prepared by a suspension polymerization process in which the monomers are dispersed as small droplets in water and polymerized therein. The polymerization is generally carried out at a temperature in the range of 30° C. to 70° C. in the presence of about 0.005% to 2%, based on the weight of the monomers, of a free radical generating polymerization initiator, such as lauroyl peroxide, benzoyl peroxide, diisopropylperoxy dicarbonate, tertiary butyl peroxypivalate, azobisisobutyronitrile, and the like. A small amount of a suspending or dispersing agent, such as methylcellulose, gelatin, hydrolyzed polyvinyl acetate, vinyl acetate-maleic anhydride polymers, and the like, may also be present during the polymerization. The copolymers produced may be dried by spray-, drum-, or tray-drying techniques or by any other known technique for drying polymeric materials. Common additives such as plasticizers, pigments, fillers, heat and light stabilizers, and the like, may be added in the amounts ordinarily used for these purposes to modify the properties of the copolymers.

The novel vinyl chloride-$\alpha$-olefin copolymers are of particular value in the production of compositions that are to be used as floor coverings, wall coverings, shoe soles and heels, and the like. These compositions are usually prepared by milling a vinyl halide polymer with fillers such as calcium carbonate and asbestos, stabilizers, plasticizers and other additives at an elevated temperature until a homogeneous composition is obtained. When poly(vinyl chloride) is used in these compositions, the incorporation of calcium carbonate during the milling operation is difficult and time consuming. The maximum amount of calcium carbonate that can be used is limited to that which can be incorporated into the composition by milling within a reasonable period of time. Considerably less difficulty is encountered in incorporating calicum carbonate and other fillers into compositions containing the vinyl chloride-$\alpha$-olefin copolymers of this invention. Compositions containing these copolymers are therefore more economical to prepare and use than are those containing poly(vinyl chloride) since either less milling time is required to incorporate in the composition a given amount of calcium carbonate or a greater amount of calcium carbonate can be incorporated in the composition during the milling period.

The invention is further illustrated by the example that follows:

EXAMPLE

A series of polymers was prepared by heating the following polymerization systems in a stirred autoclave at 62° C. for about 10 hours.

| | Parts by weight | | | |
|---|---|---|---|---|
| | Ex. A | Ex. B | Ex. C | Compound, Ex. D |
| Vinyl chloride | 98.75 | 97.50 | 98.75 | 100 |
| Octadecene-1 | 1.25 | 2.50 | | |
| Hexadecene-1 | | | 1.25 | |
| Water (deionized) | 187 | 187 | 187 | 187 |
| Methylcellulose (Methocel-15) | 0.75 | 0.75 | 0.75 | 0.75 |
| Lauroyl peroxide | 0.175 | 0.200 | 0.175 | 0.094 |

The relative rates at which the systems of Example A and Comparative Example D polymerized is shown in the following table:

|  | Percent conversion | |
| --- | --- | --- |
|  | Example A | Compound, Example D |
| Reaction time (hours): | | |
| 0 | 0 | 0 |
| 2 | 17.5 | 10.0 |
| 4 | 42.5 | 26.5 |
| 6 | 72.5 | 47.5 |
| 8 | 87.0 | 77.0 |
| 9 | 90.0 | 88.5 |
| 10 | 92.0 | 91.5 |

From these data it will be seen that after a short inhibition period, the rate of polymerization of the system of Example A was uniform until depletion of the monomer brought about a decrease in the rate of polymerization; whereas in the absence of a long chain α-olefin (Comp. Ex. D), the rate of polymerization accelerated continuously until depletion of the monomer affected the rate of polymerization.

The terms and expressions which have been employed are used as terms of description and not of limitation. There is no intention in the use of such terms and expressions of excluding any equivalents of the features shown and described or portions thereof; it is to be recognized that various modifications are possible within the scope of the invention claimed.

What is claimed is:

1. In the process for the polymerization of vinyl chloride in the presence of a free radical generating initiator at a temperature in the range of 30° C. to 70° C., the improvement that comprises adding to the vinyl chloride prior to the start of the polymerization reaction about 0.1 percent to above 5 percent, based on the weight of the vinyl chloride, of an α-olefin selected from the group consisting of decene-1, dodecene-1, tetradecene-1, hexadecene-1, octadecene-1, eicosene-1, docosene-1, and mixtures thereof and thereby controlling the rate at which the vinyl chloride polymerizes.

2. The process of claim 1 wherein 0.5 percent to 3 percent, based on the weight of the vinyl chloride, of said α-olefin is added.

3. The process of claim 2 wherein the α-olefin is hexadecene-1.

4. The process of claim 2 wherein the α-olefin is octadecene-1.

5. A copolymer made by polymerizing a monomer mixture containing about 95 percent to 99.9 percent by weight of vinyl chloride and about 0.1 percent to 5 percent by weight of an α-olefin selected from the group consisting of decene-1, dodecene-1, tetradecene-1, hexadecene-1, octadecene-1, eicosene-1, docosense-1, and mixtures thereof.

6. A copolymer as set forth in claim 5 that is made by polymerizing a monomer mixture containing 97 percent to 99.5 percent by weight of vinyl chloride and 0.5 percent to 3 percent by weight of said α-olefin.

7. A copolymer as set forth in claim 6 wherein the α-olefin is hexadecene-1.

8. A copolymer as set forth in claim 6 wherein the α-olefin is octadecene-1.

References Cited

UNITED STATES PATENTS

| 3,256,256 | 6/1966 | Reding et al. | 260—87.5 |
| 3,265,677 | 8/1966 | Delacreataz et al. | 260—87.5 |
| 3,063,977 | 11/1962 | Holdsworth et al. | 260—87.5 |

FOREIGN PATENTS

| 985,948 | 3/1965 | Great Britain | 260—87.5 |

JAMES A. SEIDLECK, Primary Examiner

U.S. Cl. X.R.

260—92.8

UNITED STATES PATENT OFFICE
CERTIFICATE OF CORRECTION

Patent No. 3,560,462　　　　　　　　Dated February 2, 1971

Inventor(s) Elliott Farber et al.

It is certified that error appears in the above-identified patent and that said Letters Patent are hereby corrected as shown below:

Column 1, line 24, "thier" should read -- their --.
Column 2, replace line 4 with the following: -- obtained when hexadecene-1 or octadecene-1 was present --.

Signed and sealed this 4th day of January 1972.

(SEAL)
Attest:

EDWARD M. FLETCHER, JR.　　　　ROBERT GOTTSCHALK
Attesting Officer　　　　　　　　Acting Commissioner of Pater